United States Patent [19]

Rohner et al.

[11] Patent Number: 4,492,089

[45] Date of Patent: Jan. 8, 1985

[54] FLEXIBLE CRYOGENIC CONDUIT

[75] Inventors: Peter Rohner, Isernhagen; Klausdieter Schippl, Laatzen; Günther Blumenberg; Werner Meyer, both of Hanover, all of Fed. Rep. of Germany; Wolfgang Obert, Oxford, England

[73] Assignee: Kabelmetal Electro GmbH, Hanover, Fed. Rep. of Germany

[21] Appl. No.: 531,054

[22] Filed: Sep. 12, 1983

[30] Foreign Application Priority Data

Sep. 17, 1983 [DE] Fed. Rep. of Germany ....... 3234476

[51] Int. Cl.³ .................... F16L 11/11; F16L 11/12
[52] U.S. Cl. ........................ 62/55; 174/155; 138/111; 138/149; 138/121
[58] Field of Search ............ 174/155; 62/55; 138/111, 121, 122, 132, 129, 149, 112, 113

[56] References Cited

U.S. PATENT DOCUMENTS

| 3,315,703 | 4/1967 | Matthews et al. | 138/111 |
| 3,473,575 | 10/1969 | Vogelsang et al. | 138/149 |
| 3,565,118 | 2/1971 | Stearns | 174/155 |
| 3,835,240 | 9/1974 | Matthaus | 174/155 |
| 3,947,622 | 3/1976 | Graneau | 174/155 |

FOREIGN PATENT DOCUMENTS 2342160  2/1975  Fed. Rep. of Germany .

Primary Examiner—John W. Shepperd
Attorney, Agent, or Firm—Ralf H. Siegemund

[57] ABSTRACT

The interior of a tube provided for low temperature operation is shielded from the exterior through a plurality of metal ribbons helically looping around the tube in an intertwined relationship and each carrying a welded on conduit for low temperature liquid whereby one of these conduits serves as a primary or outgoing conductor, and the two others serve as return paths; suitable spacers are provided to position the system in a concentric relation; inner and outermost tubes are preferably corrugated and the immediate interior of the outermost tube is filled with superinsulation.

5 Claims, 1 Drawing Figure

U.S. Patent  Jan. 8, 1985  4,492,089
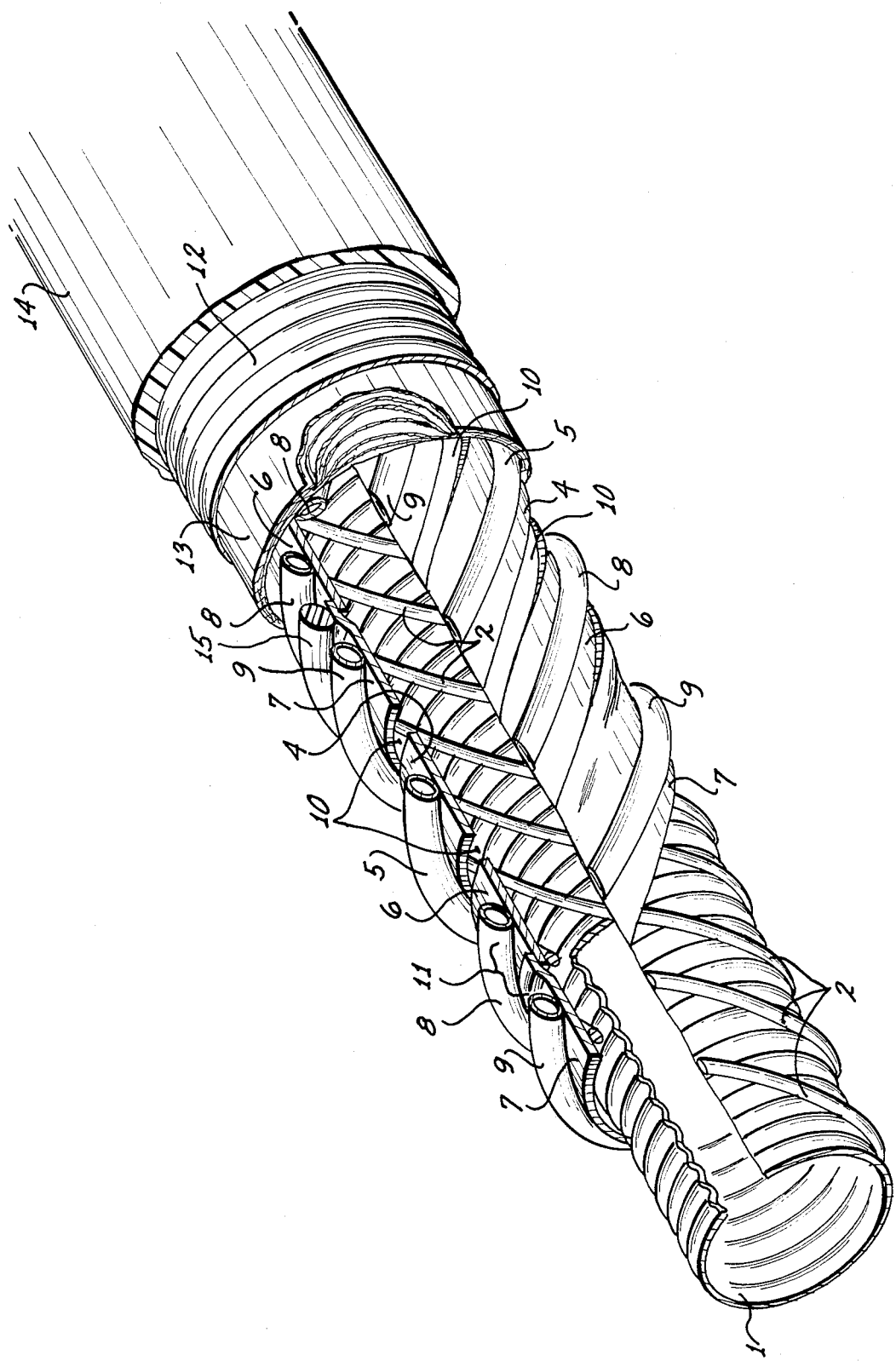

FLEXIBLE CRYOGENIC CONDUIT

BACKGROUND OF THE INVENTION

The present invention relates to a system for the conduction of fluids and includes two concentrically arranged tubes and more particularly, the invention relates to a concentric tube system of the type requiring thermal insulation of the content of the interior tube. The content of the inner one of the two tubes may be a low temperature fluid or it may be a cryogenic cable, and particularly the space between the inner and the outer tube is flown through in some fashion by a coolant having as a primary function the thermal isolation of the interior content of the inner tube from the environment.

German printed patent application No. 23 42 160 discloses a cryogenic cable wherein the conductor is encased in a tubular shield which in turn carries a helical conductor for liquid nitrogen. The nitrogen conduit is metallically secured to the shielding tube containing the conductor. This kind of an arrangement may as such be satisfactory but is disadvantaged by the fact that the metallic connection e.g. welding between the conductor containing tube and the helical conduit for nitrogen has to be established as a separate working step. Moreover, in a two conduit type system contained within the same cable assembly a heat exchange between them cannot be prevented. The shielding tube as disclosed in that patent is rather rigid so that the arrangement as a whole is very stiff which means that installation is quite cumbersome.

DESCRIPTION OF THE INVENTION

It is an object of the present invention to provide a new and improved thermal shield for tube systems which is separated from the particular conduction of cryogenic fluid and is fully effective independently from such a conduction without impairing and impeding any flexibility the tube or tube system may possess.

It is a particular object of the present invention to improve concentric tube systems wherein the inner one of the two tubes may be a conduit for fluid having a particular temperature or it may contain a cryogenic cable and wherein a thermal shield is provided in the space between the inner and the outer tube.

In accordance with the preferred embodiment of the present invention, it is suggested that the thermal shield be arranged in the interspace between the inner and the outer tube of a concentric tube system as per the specific object and the shield system is comprised of helically arranged metallic strips or ribbons looping around the inner one of the concentric tubes and that helical cooling conduits are disposed upon the radially outwardly facing surfaces of the metallic ribbons, the outer one or the concentric tubes being disposed on top of the helical conduits for the coolant.

The inventive arrangement has the advantage that the particular arrangement between the inner and the outer tube and here particularly the metallic ribbons can be easily disposed upon the inner one of the concentric tubes through a rotating machine, and the connection (welding) between the metallic strips or ribbons and the helical conduits for the coolant has been made in advance. This connection may entail bonding or spot welding. Preferably, however, continuous welding will be employed. The latter welding technique insures large surface connections for a good heat transfer between the respective ribbon and the coolant duct it carries. In view of the overall flexibility of the arrangement provided between the inner and the outer tube, the flexibility of the tube system of such is no impaired. This flexibility may result from corrugation of the tubes, or at least of one of the tubes, in the concentric tube system.

It was found to be advantageous to provide the thermal shield in the form of three parallel looped ribbons whereby one thermal conduit is affixed to one of the ribbons and is provided for flow of coolant in one (i.e. the outgoing) direction while the return path for the coolant is established by the separate helical conduits which are affixed respectively to the other two ribbons. This arrangement has the advantage that the cooling shield may contain the complete conduit system. Moreover, the complete conduit system can have feed and discharge points at one and the same end of the tube system as a whole. This way one avoids special return paths outside of the cable. Moreover, the inherent pressure loss which is higher in the return path is reduced as a result of the twin conduit construction.

It may be of advantage and is another feature of the invention to provide the ribbons or strips carrying the return path of the coolant in an overlapping configuration. This then permits an immediate and direct transfer of thermal energy between the return path conductors which stabilize the thermal shield as a whole.

The ribbon or strip carrying the conduit for the primary, outgoing flow of coolant is preferably axially spaced apart from the ribbon carrying the return path conduits. This feature permits, in fact, a highly effective separation of primary, outgoing flow and return flow of the coolant within the cable or tube system so that these two branches of the coolant are not directly placed in a heat exchange relationship.

In the case of an overlap of the ribbons or strips carrying the return path a helical groove is formed between the two tubes which groove can be utilized for accommodating spacers, particularly spacers that mount the outer tube in concentric relation to the inner tube. This spacer helix can be placed into the groove whereby the foot portion of the spacer helix is used as a support for the outer tube.

Description of the Disclosure

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates a view into a tube system in accordance with the preferred embodiment of the invention wherein successive layers are shown in a peeled away relationship.

Proceeding now to the detailed description of the drawings, there is illustrated a cryogenic conduit to be used for a preferred mode of conduction of a liquid or gaseous coolant. This particular system includes an inner tube 1 constituting the conduit proper for the coolant. However, it can readily be seen that this inner tube 1 could also be a casing around a cryogenic cable. For reasons of flexibility, it is of advantage to provide the inner tube 1 with a corrugation so that the tube as such and through it the system as a whole is a flexible one.

The inner tube 1 is provided with a helix 2 being composed of stranded individual strings or filaments. This helix 2 serves as a spacer. A thermal shield is disposed upon the helix 2. The shield is comprised of three parallelly wrapped or wound metallic strips or ribbons 4, 6 and 7. These strips are in effect three intertwined helices. The individual metal strips or ribbons carry welded-on conduits for the coolant. In particular, a conduit 5 is welded on the metal strip or ribbon 4 and loops around the system to provide primary, outgoing conduction of coolant along the conduit system. The coolant may be liquid nitrogen.

This helix carrying the conduit 5 is as far as the helical arrangement is concerned and on a loop for loop basis flanked on either side by conduits 8 and 9 respectively welded on top of the ribbons or strips 6 and 7. These conduits 8 and 9 together constitute the return path for the coolant. The ribbons 6 and 7 are wrapped in a manner so that along the respective sides not facing the ribbon 4 they overlap, while a distance or space 10 is provided between the ribbon 4 and the ribbons 6 and 7 on either side. Hence, conduit 5 is thermally isolated from conduits 8 and 9, while the latter are in heat conductive relation due to the overlap of ribbons 6 and 7.

Reference numeral 11 refers to a helical groove which is established by the space between the two conduits 8 and 9. This groove contains a helical spacer 15 which, in effect, supports the shield 3 and through it the inner tube 1 as against the outer tube of the system 12. The innermost diameter of the outer tube 12 is larger than the outermost dimension of each of the helices established by the tubes 5, 8 and 9, so that the outer tube 12 does not rest directly on these conduits or on spacer 15. The space between these conduits and the outer tube 12 is preferably filled with a so-called superinsulation 13 which is composed of multiple layers of minimal contact providing insulation in the sense of conduction as well as of radiation. Insulation provides a supplementary spacing function.

The configuration of the assembly outside of the outer tube 12 can be constructed differently. The tube 12 may well be the inner tube of another concentric tube system whereby further thermal isolation is provided for in the radially outwardly extending space around the tube 12. However, in many instances it may suffice that the other outer tube 12 is first covered with a thermoplastic envelop or jacket 14 which provides both additional thermal insulation as well as more mechanical protection.

As was mentioned above, the tube 1 can be understood to be a conduit for a liquid or as a casing for a cable. However, additional and alternative modes of operation are feasible. For example, in the case of the transport of liquid helium tube 1 should be the outer one of a further tube system which includes one, two or more concentric tubes contained in the tube 1 and separated from each other through a spacer construction and wherein the inner one serves the transport of helium proper; the tube enveloping this innermost tube is separated from the innermost tube through a spacer with evacuated space in between while the space between the other one of the two tubes and the space between the tube 1 is a flow space flown through by another coolant to provide a gradient of thermal isolation. Generally speaking the system is adaptable to and applicable for multiple concentric tube systems with coolant, i.e. suitable liquids provided as thermal isolation at particular well defined temperatures between more interior and more exterior portions of the system.

The invention is not limited to the embodiments described above but all changes and modifications thereof not consituting departures from the spirit and scope of the invention are intended to be included.

We claim:

1. A cryogenic tube system including at first corrugated tube, the interior of which is to be thermally isolated against the exterior at large; and a second, outer also corrugated tube concentrically arranged with respect to said inner tube, to establish a flexible assembly comprising:

a plurality of metallic ribbons being of a flat cross-section and arranged helically in an intertwined relationship around said inner tube;

a corresponding plurality of conduits for coolant affixed respectively to said ribbons, facing the outer tube and looping accordingly around said inner tube in a configuration of intertwined helices; and spacer means arranged with respect to the aforementioned assembly for supporting thereon said outer tube.

2. Tube system as in claim 1 wherein said conduits are welded respectively to said ribbons providing continuous uninterrupted welding contact.

3. A system as in claim 1 there being altogether three ribbons and three conduits accordingly, one of them serving as primary outgoing conduit, the two others serving as return path for the coolant.

4. A system as in claim 3 wherein the ribbons carrying the conduits serving as return paths overlap while the ribbon carrying the primary conduit is axially spaced from the respective two other ribbons.

5. A system as in claim 4 said spacer means being disposed partially in between the conduits serving as return paths.

* * * * *